Sept. 7, 1937.  C. G. BLAKENEY ET AL  2,092,103
AUTOMATIC BEAN CUTTER
Filed May 7, 1934  3 Sheets-Sheet 1
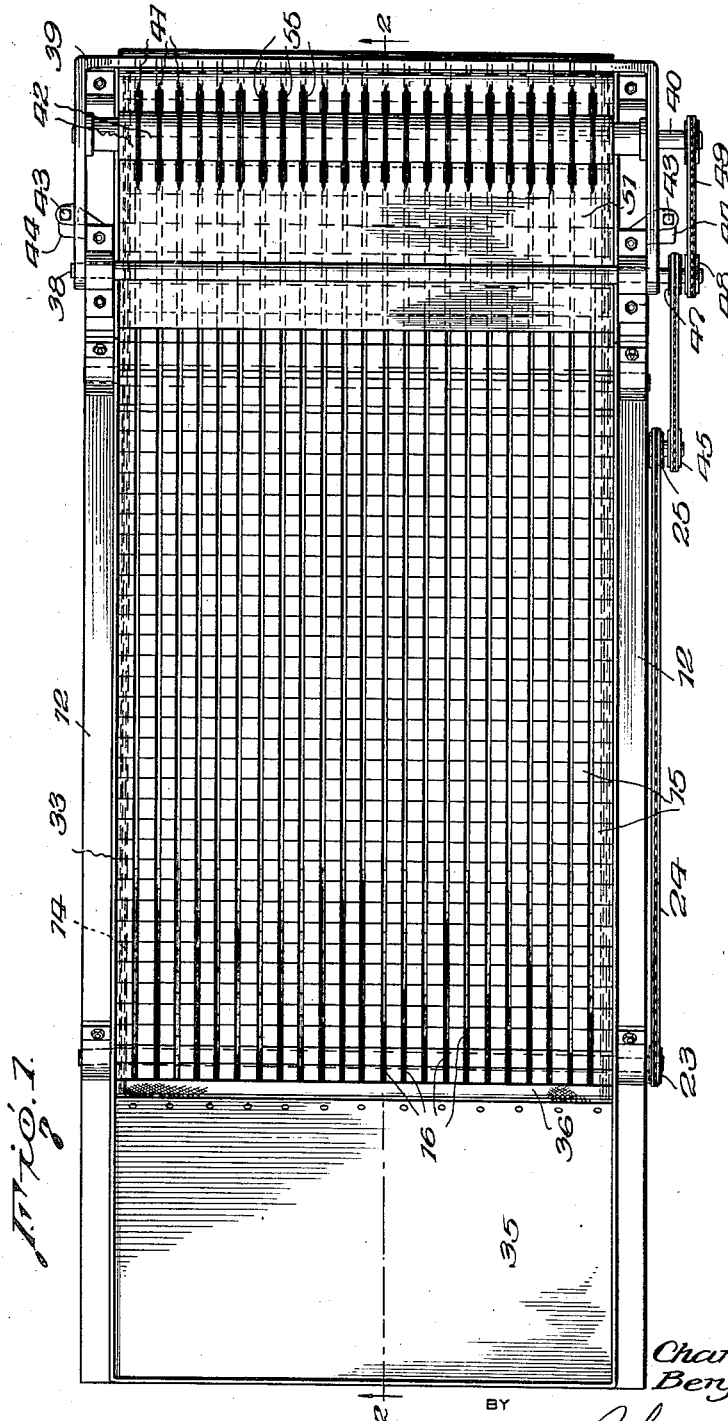
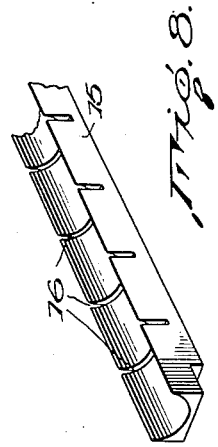
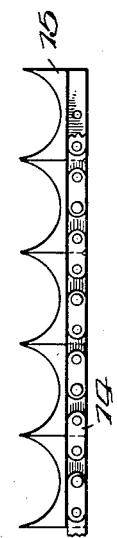
INVENTORS
Charles G. Blakeney
Benjamin I. Buck
BY
Church & Church
THEIR ATTORNEYS

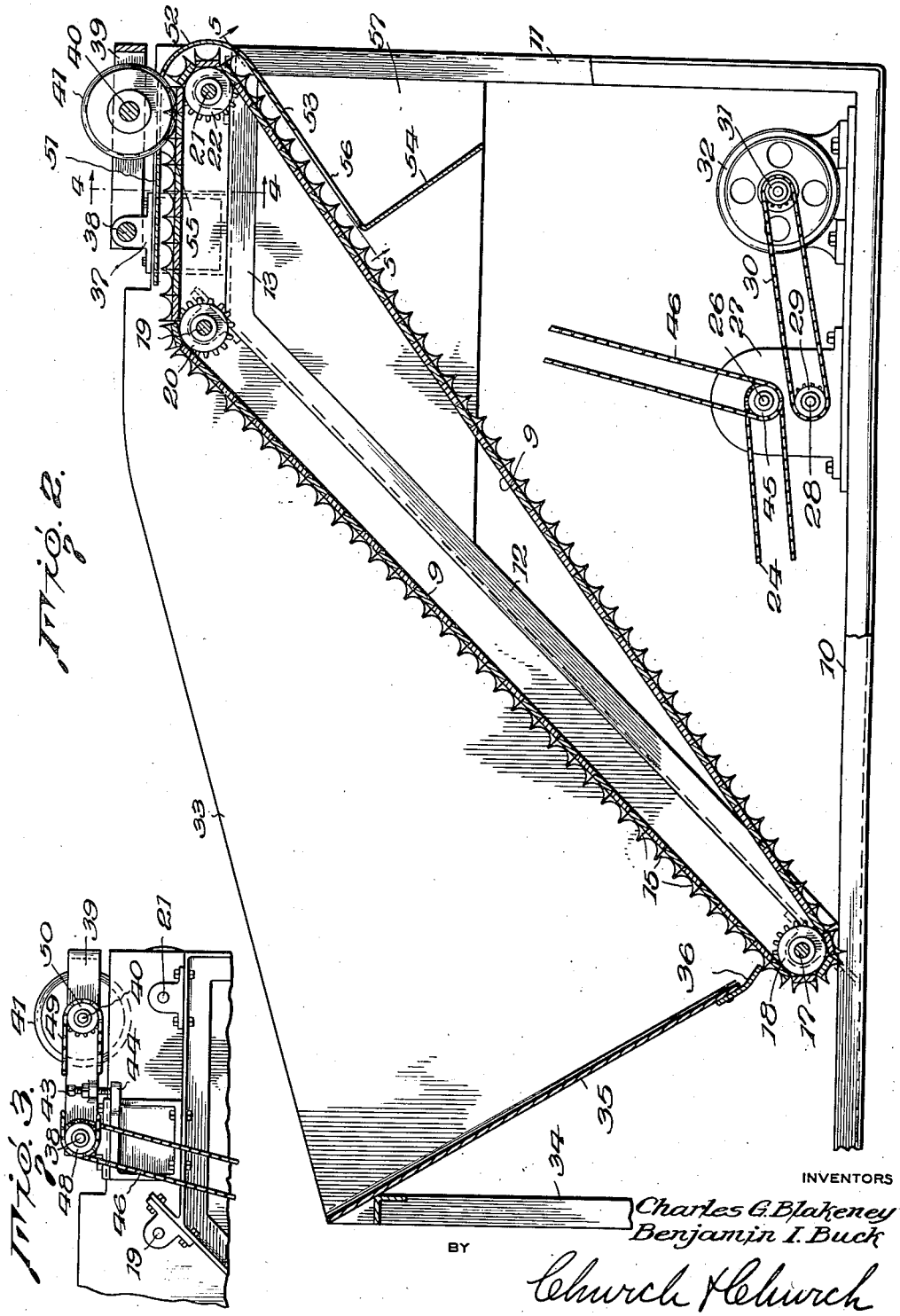

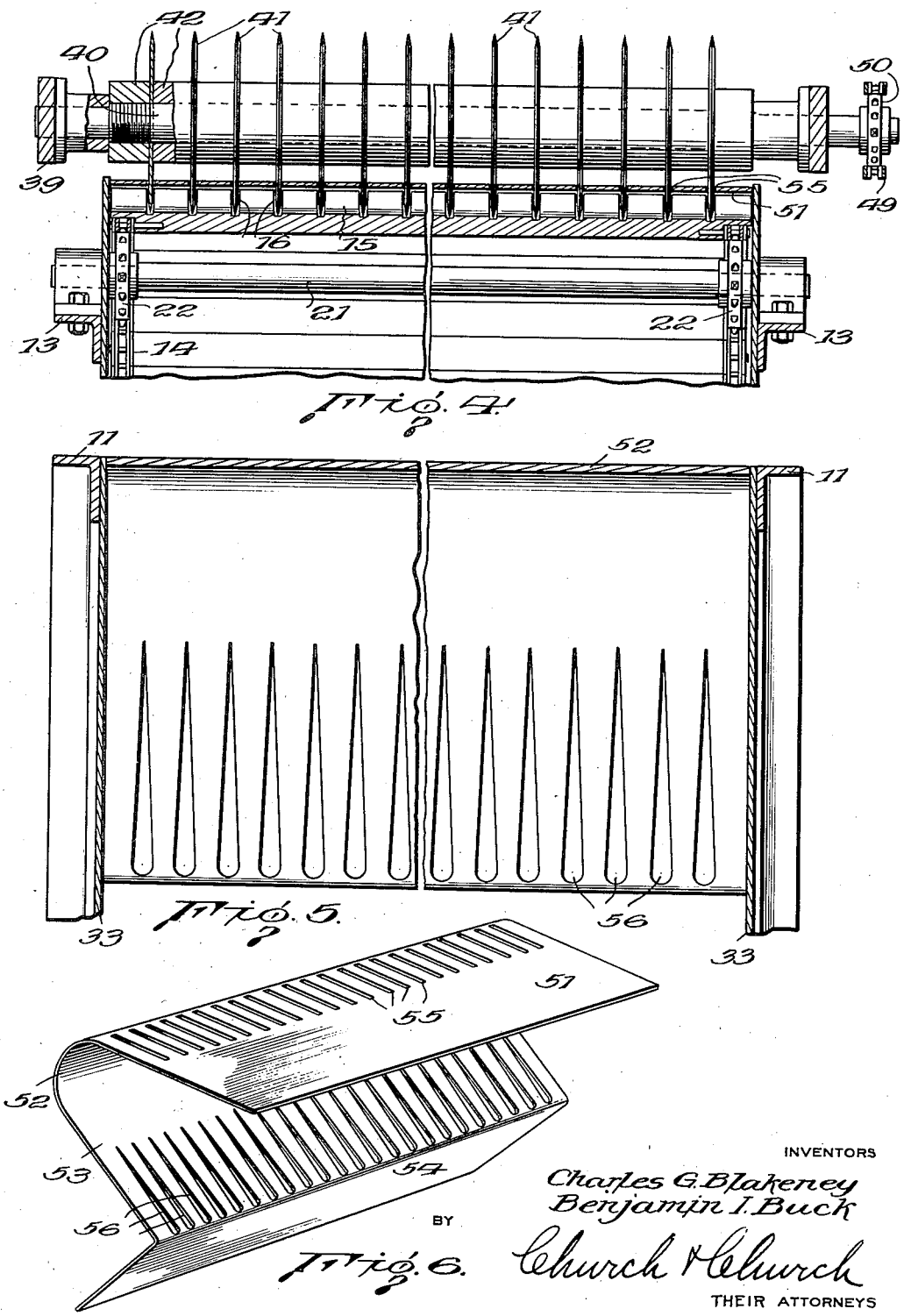

Patented Sept. 7, 1937

2,092,103

UNITED STATES PATENT OFFICE 2,092,103

AUTOMATIC BEAN CUTTER

Charles G. Blakeney and Benjamin I. Buck, Baltimore, Md., assignors to The B. I. Buck Company, Baltimore, Md., a corporation of Maryland Application May 7, 1934, Serial No. 724,440

5 Claims. (Cl. 146—86)

Our invention relates to improvements in automatic bean cutters and has to do, more particularly, with machines for automatically cutting bean pods, such as green or wax stringless beans, into desired lengths for canning.

In canning beans, the pods are usually snipped and then cut into lengths, which may vary according to the practice in different canneries. These lengths may be one-half inch, three-quarter inch or one inch, for example. This cutting is usually done after the beans are snipped and before they are blanched. The principal object of our invention, therefore, is to provide a simple and inexpensive but efficient machine for automatically cutting bean pods into lengths desired for canning.

A further object of our invention is to provide such a machine in which the knives will always make transverse cuts through the bean pods, the pods, when presented to the knives, lying substantially at right-angles to them. Thus, one object of our invention is to provide a machine in which the pods will not be presented to the knives wholly, or partially, end on, so that the knives do not make diagonal cuts through the pods in cutting them into sections.

A further object of our invention is to provide an automatic bean cutting machine in which the beans will be cut instead of being crushed, as is the case with some machines which have been proposed for this service.

A further object of our invention is to provide a machine which can be very readily and quickly adjusted so as to produce sections of different lengths. For instance, the machine may be arranged to cut one-half inch sections and, by simple adjustment, can be transfomed so as to cut one inch sections.

A further object of our invention is to provide a machine of the character described, which will automatically cut the bean pods into sections of the desired length and separate undersize sections from those of the required size.

Further objects, and objects relating to economies of construction and details of operation, will definitely appear from the detailed description to follow. In one instance, we accomplish the objects of our invention by the devices, and means described in the following specification. Our invention is clearly defined and pointed out in the appended claims. A structure, constituting a preferred embodiment of our invention, is illustrated in the accompanying drawings, forming a part of this specification, in which:

Figure 1 is a top plan view of a machine embodying our invention;

Fig. 2 is a vertical, sectional view taken on the line 2—2 of Fig. 1, a part of the driving mechanism being shown in side elevation;

Fig. 3 is a fragmentary view, in side elevation of that part of the machine shown, in section, in the upper right-hand corner of Fig. 2;

Fig. 4 is a vertical, sectional view taken on the line 4—4 of Fig. 2;

Fig. 5 is a detail, sectional view taken on the line 5—5 of Fig. 2;

Fig. 6 is a perspective view of the guard;

Fig. 7 is a view in side elevation of a portion of the conveyor; and

Fig. 8 is a fragmentary, perspective view of a portion of one of the conveyor flights.

In general, our invention consists of a hopper, to receive a supply of bean pods to be cut into sections, and an endless conveyor, which runs through the hopper, taking bean pods from said hopper and carrying them past a plurality of laterally-spaced knives, or cutting disks, which cooperate with the conveyor to cut bean pods thereon into sections. We propose to provide a conveyor which is made up of a plurality of trough-shaped flights, having found that, when such a conveyor is moved through a hopper, the pods will tend to lie lengthwise of the trough-shaped flights and, by arranging the axis of the cutting knives parallel to the flights, we insure that the pods will be cut into sections by transverse cuts substantially at right-angles to the length of the pod. We propose, further, to provide each of these trough-shaped flights with a plurality of transverse, parallel kerfs, in which the cutting knives, or disks, work as the flights pass the knives. We propose to provide a mounting for the cutting knives consisting of a pivoted frame, in which a driven shaft is journaled, and the cutting disks are mounted in parallel, laterally-spaced relation upon this driven shaft. Of course, the spacing of the disks on the shaft must correspond to the spacing of the kerfs in the flights, because the kerfs are intended to receive the cutting disks as the flights pass the cutters. Because the cutting disks are mounted in a pivoted frame, they may rise and fall with reference to the conveyor, so that, if hard metallic objects, such as nails or pieces of wire should happen to be mixed with the bean pods and carried past the knives by the conveyor, the knives may rise, to permit such objects to pass without injury to the cutting edges, and fall back into operative position as soon as such objects have passed. The shaft which bears the cutting knives is driven by suitable connections, centering at the pivot of the frame and leading to the motor which operates the machine.

We propose to provide, further, a guard, which is mounted in spaced relation to certain portions of the conveyor. This guard is to be provided with a series of parallel slots through which the cutting knives work. It will be seen that this guard will provide a channel through which the bean pods are carried by the conveyor past the cutters. We propose to extend this guard, in spaced relation to the conveyor, adjacent a portion of the lower reach of the conveyor, so that, after the bean pods are carried past the cutters and have been severed into sections, they will be supported against dropping from the flights in the lower reach by such guard. We propose to provide, in this portion of the guard, a series of parallel openings through which undersize sections may drop, the standard size sections being retained by the guard in the flights until the latter have passed the end of the guard, when the sections may drop into a suitable receptacle for them. Thus, there is an automatic separation of undersize sections.

Referring to the numbered parts of the accompanying drawings, in which we have illustrated a preferred embodiment of our invention, the machine is provided with a frame comprising the base members 10, the vertical upright members 11, the inclined members 12 and the upper members 13. An endless conveyor, indicated generally by the numeral 9, is mounted upon this frame. The conveyor comprises a pair of side chains 14, upon which there are supported a plurality of trough-shaped flights 15. As shown in Figs. 4 and 8, each of these flights has formed therein a plurality of parallel, transverse kerfs 16. The chains 14 of the endless conveyor pass around the sprockets 18, fixed on the driven shaft 17, which is journaled in bearings at the lower end of the inclined frame members 12. The conveyor chains also pass over sprockets 20, fixed on the shaft 19, journaled in bearings at the upper ends of the inclined frame members 12, and also around sprockets 22, fixed on the shaft 21, journaled in bearings mounted at the rear ends of the upper frame members 13. It will be seen that these sprocket shafts are so mounted that the endless conveyor has an upper inclined reach, running through a hopper to be described, a substantially horizontal reach, between the sprockets 20 and 22, and an inclined lower reach, between the sprockets 22 and 18.

The sprocket shaft 17 is driven through a sprocket 23 thereon, which is connected by a chain 24 with a sprocket 25 on a shaft 26, which, through a gear reduction 27, is driven from the sprocket 29 on shaft 28. The sprocket 29 is connected by chain 30 to the sprocket 31 on the shaft of electric motor 32.

A hopper is provided to receive a supply of bean pods to be cut into sections and the endless conveyor runs through this hopper. The hopper may comprise the side walls 33 and the inclined front wall 35, supported by the frame 34. The front wall 35 stops short of the conveyor and a flexible strip, or apron, 36, is secured to the lower edge of said wall 35, and is brushed against by the conveyor flights as they move from the sprocket 18 upwardly along the upper reach of the conveyor. This flexible strip, or apron, constitutes a flexible closure for the hopper at this point and its movement, as the flights pass, causes a slight agitation of the contents of the hopper which we believe to be helpful in filling the trough-shaped flights with bean pods lying longitudinally thereof. The upper inclined reach of the conveyor, between the sprocket shafts 17 and 19, constitutes a movable bottom for the hopper. We have found that, when a conveyor of the character shown is caused to move through the hopper 33, bean pods in the hopper will be caught by the trough-shaped flights and lie longitudinally thereof. There will be practically no bean pods carried upwardly by the flights while lying crosswise thereof.

A pair of brackets 37 are mounted on the upper frame members 13 and a transverse shaft 38 is journaled in said brackets. The U-shaped frame 39 is pivoted on the shaft 38, and carries a cutter shaft 40 journaled in the legs of the frame. Upon shaft 40 there are mounted, so as to be rotated by the shaft, a plurality of laterally-spaced knives, or cutting disks, 41, which are held in the proper spaced relation by spacing sleeves 42, mounted on the shaft 40 between the cutting disks, and between the end disks and the side members of frame 39. It will be observed that these cutting disks are positioned adjacent the horizontal reach of the conveyor and the spacing of the disks on the shaft 40 is such that they are received in the kerfs 16 of the conveyor flights, as such flights in the horizontal reach pass the cutters. Since the frame 39 is pivoted on the shaft 38, it may turn with reference to the axis of said shaft, thus permitting the cutting disks to rise and fall. This allows the disks to ride over any metallic objects which may be carried past them by the flights, such as nails or pieces of wire which might inadvertently enter the hopper. An adjustable stop pin 43, carried by one side member of frame 39, may engage a fixed lug 44, to limit the downward movement of the cutting disks.

The cutting disks are driven through the following connections. A sprocket 45, driven from the gear reduction 27, is connected by chain 46 with a sprocket 47 fixed on shaft 38. Another sprocket 48, also fixed on said shaft 38, is connected by chain 49 with the sprocket 50, which is fast on the end of the cutter shaft 40. Thus, the driving connections to the cutter shaft include sprockets on the shaft 38, so that the frame and the cutters may turn with respect to the axis of shaft 38 without disturbing the driving connections.

We provide a guard, preferably of sheet metal, which is mounted on the frame between the side walls 57 carried thereby. This guard includes a portion 51, which is mounted in spaced relation to the horizontal reach of the conveyor, a curved portion 52, which is concentric with the axis of shaft 21, a portion 53 in spaced relation to the upper part of the lower reach of the conveyor, and an apron 54 at right-angles to the latter portion. A reference to Fig. 2 will show that this guard forms a channel through which the bean pods and sections are carried by the conveyor. A plurality of parallel slots, 55, are provided in the portion 51 of the guard, these slots being so located that they receive the cutting disks 41. Consequently, they will be in line with the kerfs 16 of the conveyor flights. The portion 53 of the guard is provided with a plurality of parallel openings 56, which are also in line with the kerfs 16 of the conveyor flights. As shown in Figs. 5 and 6, these openings 56 are of increasing width, as one passes from the upper to the lower ends thereof. The maximum width of each opening may well be about one-quarter of an inch, so that bean pod sections of less than one-quarter inch size may pass through the openings 56, to be separated from the standard size sections.

The operation of this machine should be very readily understood from the description of the parts which has been given. A supply of snipped bean pods is placed in the hopper and, as the conveyor 9 moves through the hopper, the bean pods will lodge in the trough-shaped flights of the conveyor and be carried upwardly thereon. These pods will all lie longitudinally of the flights and be carried thereby into the horizontal reach of the conveyor and beneath the portion 51 of the guard. Since the axis of the cutter disks 41 is parallel to the flights, the disks 41 will meet the pods lying in said flights at substantially right-angles, so as to cut them into right sections, as the pods are carried past the knives by the movement of the conveyor. It will be seen that the knives work through the slots 55, and are received in the kerfs 16, cooperating therewith to cut the bean pods into sections. The severed sections, still retained in the flights by the portion 52 of the guard, are carried around into the lower reach of the conveyor and here they tend to drop out of the flights, but are retained by the portion 53 of the guard and carried by the movement of the conveyor over the openings 56. At this point, the undersize sections will drop through the openings 56 and be diverted by the apron 54 into a suitable receptacle provided to receive them. As soon as the conveyor flights pass the lower end of the portion 53 of the guard, the full-size bean pod sections drop freely therefrom into a receptacle provided to receive them.

We prefer to arrange the kerfs 16 at half inch intervals and the slots 55 are correspondingly located. As shown in Fig. 4, the knives 41 are spaced at one-half inch intervals, and, with the machine thus set up, the bean pods will be cut into one-half inch sections. If, however, a canner wishes to make one inch sections, alternate knives 41 may be removed, so that the knives are located on a one inch spacing.

The machine is simple and inexpensive but very efficient and it is effective to cut the bean pods into right sections. This is a desirable feature as one complaint, which canners have against bean cutting machines now on the market, is that the bean pods may be so presented to the knives as to make a sloping, diagonal cut. Moreover, our machine makes clean cuts through the beans and does not crush them, in separating them into sections, and this is a highly advantageous feature.

We are aware that the particular mechanism here illustrated may be varied considerably, without departing from the spirit of our invention, and, we, therefore, claim our invention broadly as indicated by the appended claims.

What we claim is:

1. A bean cutter comprising the combination of a hopper to receive a supply of bean pods to be cut into sections, an endless conveyor having an inclined portion running through said hopper and including a plurality of trough-shaped flights, a pivoted frame, a driven shaft journaled therein, and a plurality of laterally-spaced cutting disks mounted on said shaft, said flights being provided with a plurality of transverse, parallel kerfs receiving said disks, and said frame being so mounted that the disks may rise and fall with respect to adjacent flights and cooperate therewith to cut bean pods thereon into sections.

2. A bean cutter comprising the combination of a hopper to receive a supply of bean pods to be cut into sections, an endless conveyor running therethrough, a plurality of laterally-spaced cutting disks cooperating with a portion of said conveyor to cut bean pods thereon into sections, and a guard mounted in spaced relation to and cooperating with a portion of the lower reach of the conveyor and provided with a plurality of parallel openings through which undersize sections may pass to separate them from the sections of required size.

3. A bean cutter comprising the combination of a hopper to receive a supply of bean pods to be cut into sections, an endless conveyor running therethrough and having a substantially horizontal reach and a lower reach, said conveyor including a plurality of trough-shaped flights, each provided with a plurality of parallel, transverse kerfs, a plurality of laterally-spaced, driven cutting disks arranged adjacent the horizontal reach and received in the kerfs of adjacent flights, and a guard mounted in spaced relation to and cooperating with a portion of the lower reach of said conveyor and provided with a plurality of spaced parallel openings through which undersize sections may pass to separate them from sections of required size.

4. A bean cutter comprising the combination of a hopper to receive a supply of bean pods to be cut into sections, an endless conveyor running therethrough and having a substantially horizontal reach and a lower reach, a guard mounted in spaced relation to a portion of said horizontal reach and a portion of said lower reach, said guard being provided with a plurality of parallel slots adjacent the horizontal reach and a plurality of parallel openings adjacent the lower reach, a plurality of laterally spaced cutting disks working in said slots and cooperating with the horizontal reach of the conveyor to cut bean pods thereon into sections, the undersize sections passing through said openings in the guard to separate them from the sections of required size.

5. A bean cutter comprising the combination of a hopper to receive a supply of bean pods to be cut into sections, an endless conveyor running therethrough and having a substantially horizontal reach and a lower reach, said conveyor including a plurality of trough-shaped flights each having a plurality of transverse, parallel kerfs therein, a guard mounted in spaced relation to a portion of said horizontal reach and an adjacent portion of said lower reach, said guard having a plurality of parallel slots adjacent the horizontal reach and a plurality of parallel openings adjacent the lower reach, and a plurality of driven, laterally-spaced cutting disks working in said slots and the kerfs of adjacent flights to cut bean pods thereon into sections, the undersize sections passing through said openings whereby they are separated from sections of required sizes.

CHAS. G. BLAKENEY.
BENJAMIN I. BUCK.